(12) United States Patent
Nitta

(10) Patent No.: US 7,076,242 B2
(45) Date of Patent: Jul. 11, 2006

(54) MOBILE STATION AND COMMUNICATION SYSTEM

(75) Inventor: Yoshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 10/072,902

(22) Filed: Feb. 12, 2002

(65) Prior Publication Data

US 2002/0107006 A1 Aug. 8, 2002

(30) Foreign Application Priority Data

Feb. 15, 2001 (JP) ........................................ 2001-039129

(51) Int. Cl.
*H04M 3/16* (2006.01)

(52) U.S. Cl. .................... 455/412.1; 455/414.1
(58) Field of Classification Search .............. 455/412, 455/418, 419, 452, 556, 575, 414; 709/219, 709/204

See application file for complete search history.

(56) References Cited

U.S. PATENT DOCUMENTS 6,085,098 A * 7/2000 Moon et al.
6,292,668 B1 * 9/2001 Alanara et al.
6,434,403 B1 * 8/2002 Ausems et al.
6,484,143 B1 * 11/2002 Swilden et al.
2001/0043273 A1 * 11/2001 Herrod et al.
2002/0028656 A1 * 3/2002 Yemini et al. ................. 455/41

FOREIGN PATENT DOCUMENTS

| EP | 0 918 423 A2 | 5/1999 |
|----|----|----|
| EP | 1 017 208 A2 | 7/2000 |
| JP | HEI 10-149270 | 6/1998 |
| JP | 11-75257 | 3/1999 |
| JP | 2000-106616 | 4/2000 |
| JP | 2000-232520 | 8/2000 |
| JP | 2000-298634 | 10/2000 |
| WO | WO 00/65800 A1 | 11/2000 |
| WO | WO 00/76172 A1 | 12/2000 |

* cited by examiner

*Primary Examiner*—David Hudspeth
*Assistant Examiner*—Huy Nguyen
(74) *Attorney, Agent, or Firm*—McGinn & Gibb, PLLC

(57) ABSTRACT

A mobile station includes a wireless communication unit and Web function unit. The wireless communication unit wirelessly communicates with a mobile communication system network. The Web function unit is connected to a content in the mobile communication system network via the wireless communication unit and has a content server function in WWW (World Wide Web). A communication system is also disclosed.

11 Claims, 5 Drawing Sheets

MOBILE STATION AND COMMUNICATION SYSTEM

BACKGROUND OF THE INVENTION

The present invention relates to a mobile station and a communication system including the mobile station.

A client-server system configuration using a conventional mobile network provides a Web information service. As shown in FIG. 5, in a conventional communication system, contents are stored in a mobile network 15, a network connected outside the mobile network 15 or a server 12 connected to a dedicated line.

To create, update, and change contents provided by the server 12, the user conventionally directly accesses the server 12 to create, update, and change the contents. This system is disclosed in Japanese Patent Laid-Open Nos. 2000-232520, 2000-298634, and 11-75257.

A conventional client-server service using a mobile station 13 such as a portable telephone as shown in FIG. 5 suffers the following problems.

First, provided contents cannot be easily changed. Even in a service which requires a real-time change of contents, content change operation must be conventionally done not from the mobile station 13 but directly or by using any data communication with respect to the generally used server 12 which manages contents.

Second, the server 12 which conventionally provides contents is expensive. Considering maintenance and management, it is economically and technically difficult for a general mobile communication network user to purchase a server apparatus and its accessory apparatus (e.g., communication apparatus) for providing contents, and to constitute a content providing environment.

SUMMARY OF THE INVENTION

It is an object of the present invention to provide a mobile station and communication system capable of easily changing provided contents.

It is another object of the present invention to provide a mobile station and communication system capable of easily providing contents at low cost.

To achieve the above objects, according to the present invention, there is provided a mobile station comprising a wireless communication unit for wirelessly communicating with a mobile communication system network, and a Web function unit which is connected to a content in the mobile communication system network via the wireless communication unit and has a content server function in WWW (World Wide Web).

DESCRIPTION OF THE PREFERRED EMBODIMENTS

Figure 1:
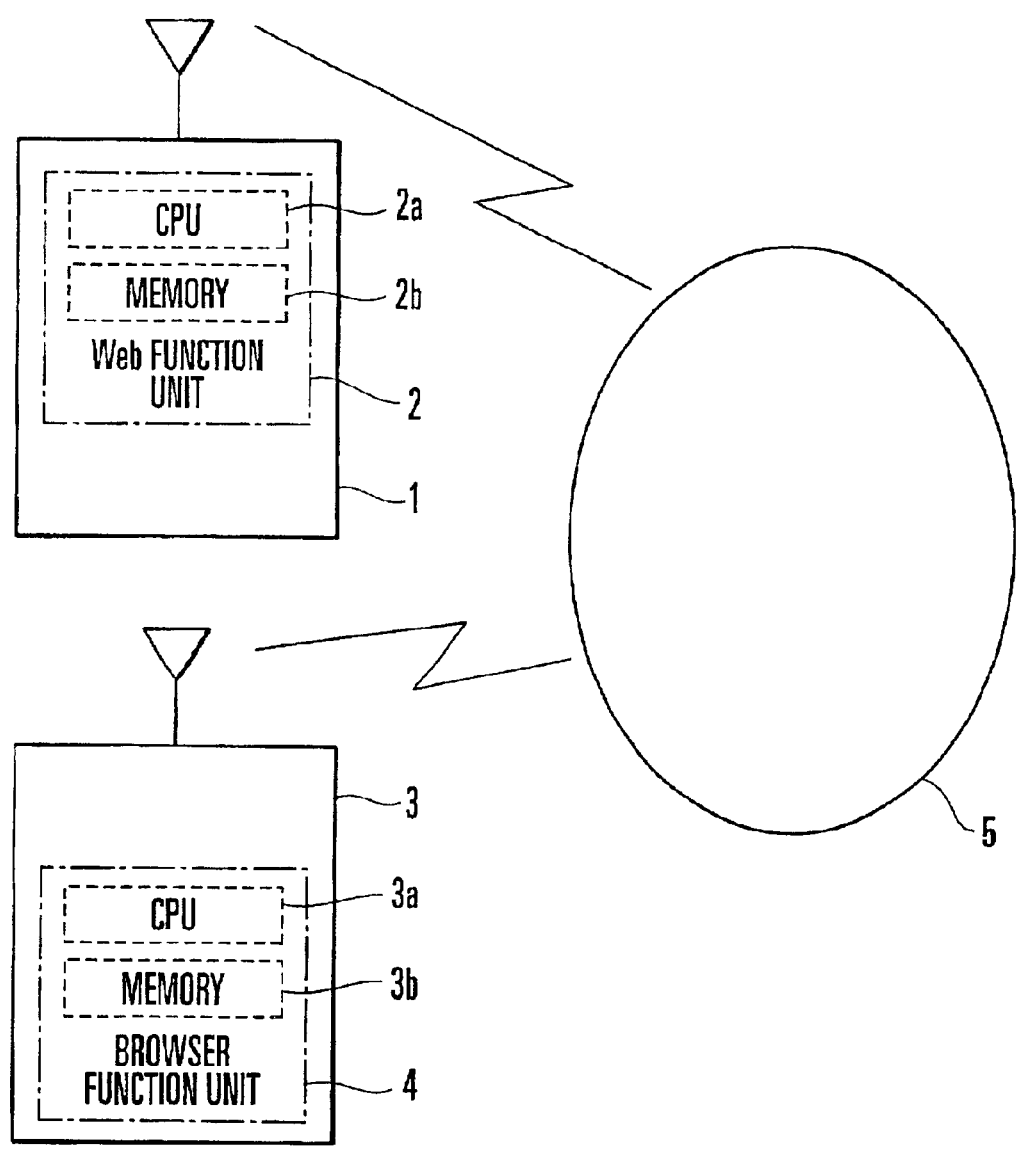
FIG. 1 is a block diagram schematically showing a communication system according to the first embodiment of the present invention.

The present invention will be described in detail below with reference to the accompanying drawings.

A mobile communication system according to the first embodiment of the present invention will be described with reference to FIG. 1. The mobile communication system according to the first embodiment comprises a mobile station 1 having a Web function, a mobile station 3 having a browser function, and a mobile communication system network 5 which wirelessly communicates with the mobile stations 1 and 3.

The mobile station 1 has a Web function unit 2. The Web function unit 2 includes hardware (CPU 2a) and software (program stored in a memory 2b) for allowing the mobile station 1 to execute a WWW (World Wide Web) function. The Web function unit 2 has WWW content server functions (WWW server function, mail server function, and/or news server function). The mobile station 1 may have a general speech communication function, or may have only a Web function. As for the browser and WWW functions, the contents of Japanese Patent Laid-Open No. 2000-298634 are incorporated in this specification.

Figure 2:
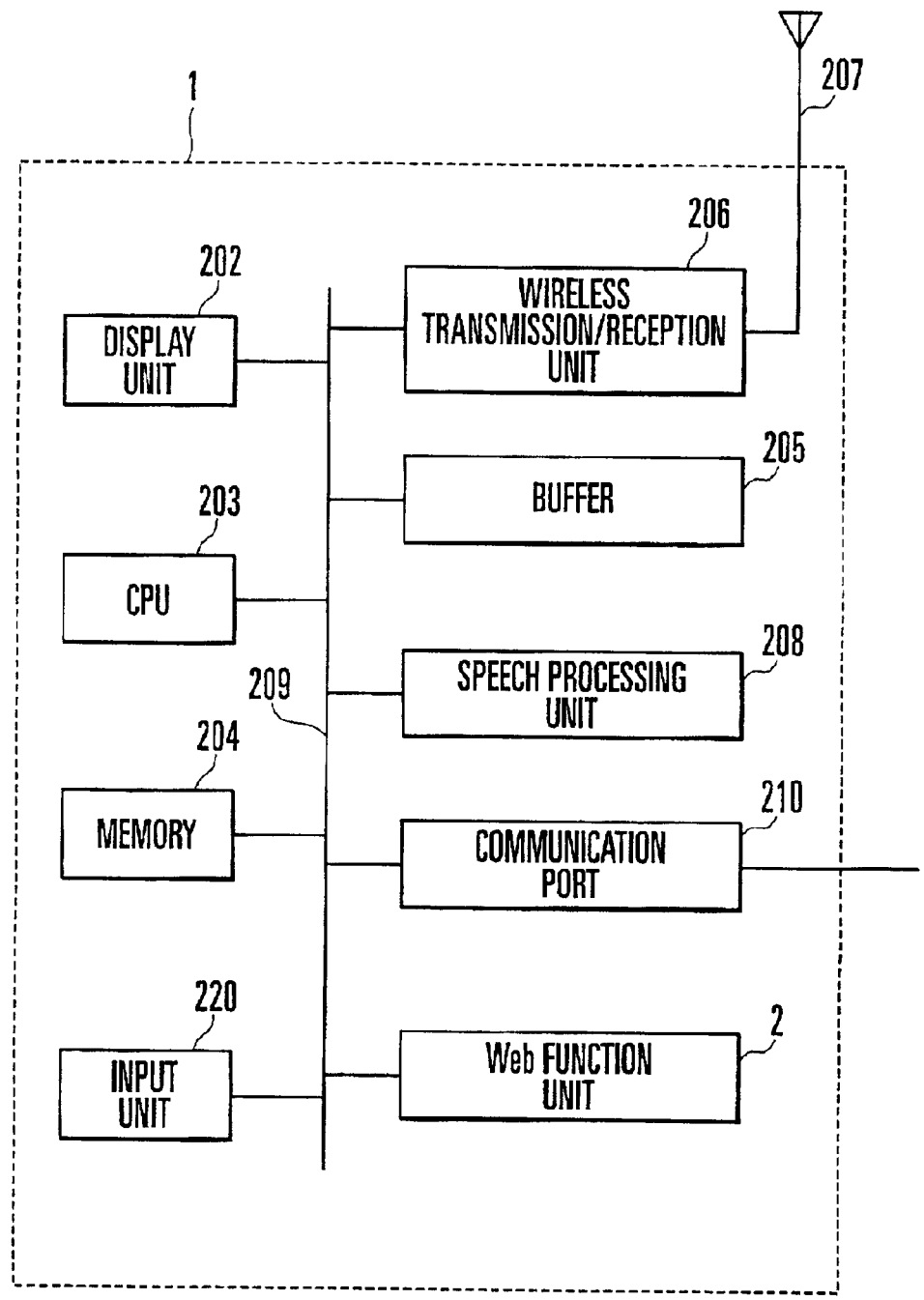
FIG. 2 is a block diagram showing the detailed arrangement of a mobile station having a Web function shown in FIG. 1.

FIG. 2 shows the detailed arrangement of the mobile station 1. In FIG. 2, the mobile station 1 formed from a portable telephone comprises the Web function unit 2, a display 202 for realizing a telephone function and receiving information services, a CPU (Central Processing Unit) 203 for executing a program to control the mobile station, a memory 204 for storing a program and data, a buffer 205 for temporarily storing received data, a wireless transmission/reception unit 206 for transmitting/receiving data with respect to the mobile communication system network 5, an antenna 207, an internal bus 209, a speech processing unit 208 connected to the wireless transmission/reception unit 206 to process speech communication, an input unit 220 formed from a keyboard or the like, and a communication port 210 for connection to an external terminal. The Web function unit 2 may be constituted by the CPU 203 and memory 204, instead of the dedicated CPU 2a and memory 2b.

The mobile station 3 comprises a browser function unit 4. The browser function unit 4 includes hardware (CPU 3a) and software (program stored in a memory 3b) for allowing the mobile station 3 to execute a browser function in Internet communication. The mobile station 3 can be one having a browser function used in the current mobile communication system. In FIG. 2, the mobile station 3 can be implemented by adding the browser function unit 4 in place of the Web function unit 2.

As shown in FIG. 1, the mobile communication system including the mobile communication system network 5 is the same in configuration as the current mobile communication system. The mobile communication system network 5 can adopt an arbitrary communication method as far as the system can achieve at least data communication. The data communication method used in the mobile communication system network 5 may be either a circuit switching method or a packet communication method.

As for the lower layer of the communication method, conditions are not limited so long as the layer can execute TCP/IP (Transmission Control Protocol/Internet Protocol) and HTTP (Hyper Text Transfer Protocol) generally used in the Internet. The communication quality (communication speed, error occurrence rate, and the like) is not directly relevant to the present invention, and a description thereof will be omitted.

One of the important features of the first embodiment is that the mobile station 1 having the Web function can be used while being connected to the mobile communication system network 5. The mobile station 1 internally (or externally) comprises the Web function unit 2. Only the mobile station 1 (and external device) realizes the function of a content providing server (server 12 in FIG. 4) directly or indirectly connected to the mobile communication system network 5.

As described above, the mobile station 1 is constructed by mounting the Web function unit 2 on a mobile station such as a portable telephone which is becoming popular for daily use. In the first embodiment, the mobile station 1 is connected to the mobile communication system network 5. In correspondence with this, the mobile station 3 (with the browser function) serving as a client in the server client system is connected to the mobile communication system network 5. This eliminates the need for connecting a conventionally indispensable server 12 having contents to the mobile communication system network 5. Only the internal configuration of the mobile communication system network 5 can realize a Web information transmission system configuration.

The operation of the communication system with the above configuration will be explained.

To communicate data for a Web information transmission/reception service between the mobile stations 1 and 3, a communication channel is established. In the mobile communication system network 5 where the communication channel is established, the mobile station 3 requests the contents held by the mobile station 1 of the mobile station 1. At this time, protocol procedures used in general wired Internet communication are utilized. That is, the Web function unit 2 in the mobile station 1 and the browser function unit 4 in the mobile station 3 use TCP/IP, HTTP, and the like to transmit the requested contents from the mobile station 1 to the mobile station 3.

In this case, if the mobile station 1 has a public cache which stores contents, the user of the mobile station 1 edits and changes the contents in the mobile station 1. Then, the user can access the cache to confirm the edited/changed results of the contents. More specifically, the user of the mobile station 1 can access the cache of the mobile station 1 to confirm the status of the edited/changed content display before another user (e.g., mobile station 3) can browse the edited/changed contents.

As described above, in the first embodiment, the mobile station 3 requests the mobile station 1 via the mobile communication system network 5 to provide contents. In accordance with this request, the mobile station 1 provides its contents to the requesting mobile station 3 via the mobile communication system network 5.

The system configuration in which the mobile station 1 with the Web function unit 2 is connected to the mobile communication system network 5 implements a Web information transmission system between the mobile stations 1 and 3 without any general-purpose server 12 which is necessary in the prior art.

The first embodiment exhibits the following effects.

First effect: Web content information can be transmitted using the mobile station 1 such as a general portable telephone without any expensive equipment. This means that the user of the mobile station 1 having the Web function can transmit Web information.

Second effect: The user can change contents in real time, compared to the prior art. Contents can be immediately changed regardless of the place. Since contents are constructed and created for the mobile stations 1 and 3, content state/changed content confirmation operation can be immediately performed by the mobile station 1 which has changed the contents (before the contents can be browsed by another mobile station 3).

Third effect: Information such as a large data amount of image or text which is difficult to transmit by e-mail used by a conventional mobile station can be easily transmitted by a Web information transmission form having a cache.

A communication system according to the second embodiment of the present invention will be described with reference to FIG. 3. The basic configuration of the second embodiment is the same as that of the first embodiment, and a difference will be mainly explained.

Figure 3:
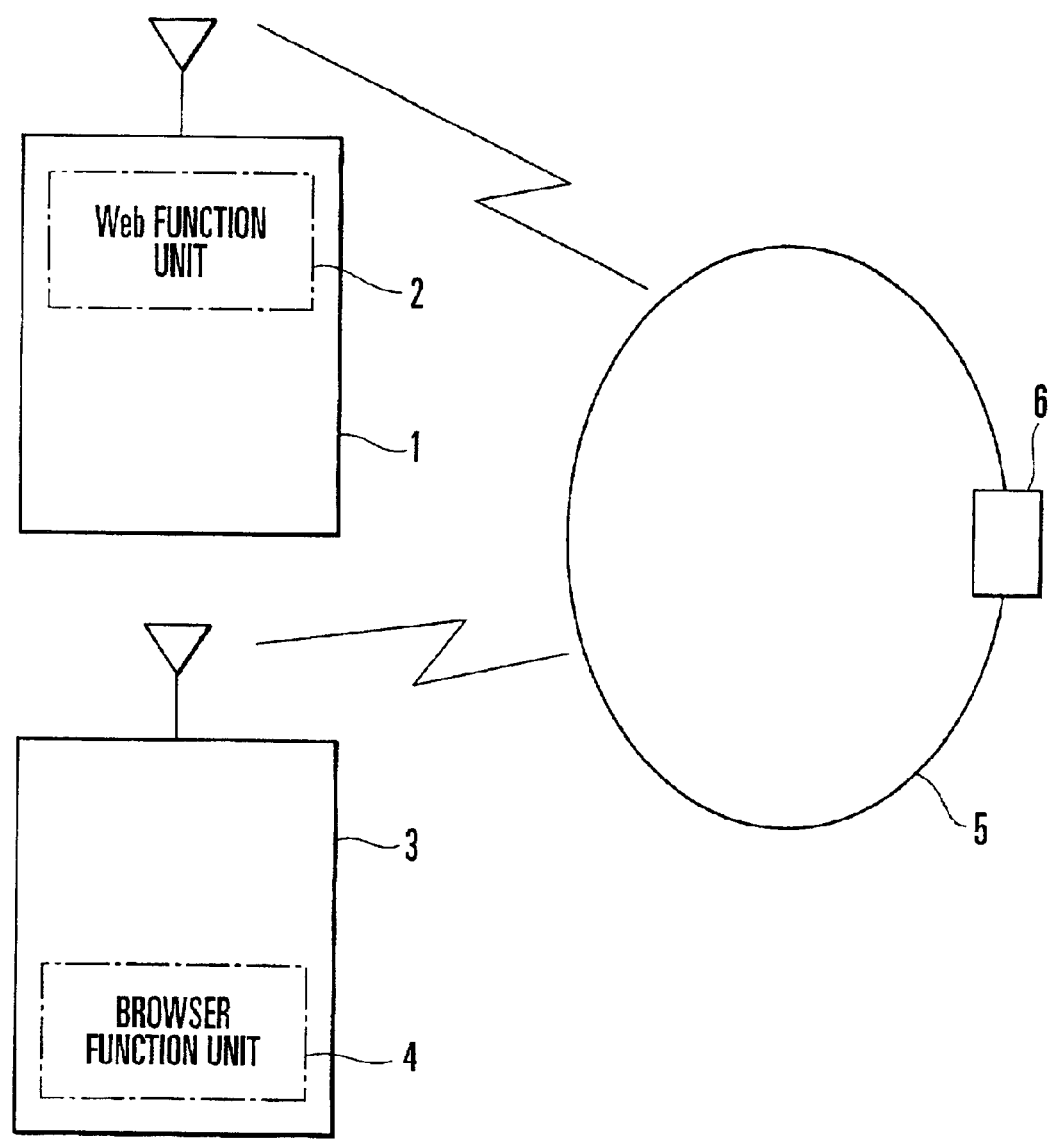
FIG. 3 is a block diagram schematically showing a communication system according to the second embodiment of the present invention.

As shown in FIG. 3, a mobile communication system network 5 comprises a mobile station authentication device 6. The mobile station authentication device 6 authorizes the use of each of mobile stations 1 and 3. The mobile station authentication device 6 can also realize use approval/rejection for a Web information transmission/reception service which can be realized only within the mobile communication system network 5. The use of the mobile station authentication device 6 also allows providing the above-described services only between specific mobile stations.

The second embodiment can limit access to contents to only a pre-designated mobile station. Only a family or specific group can access contents, which realizes the use of a private bulletin board system.

Figure 4:
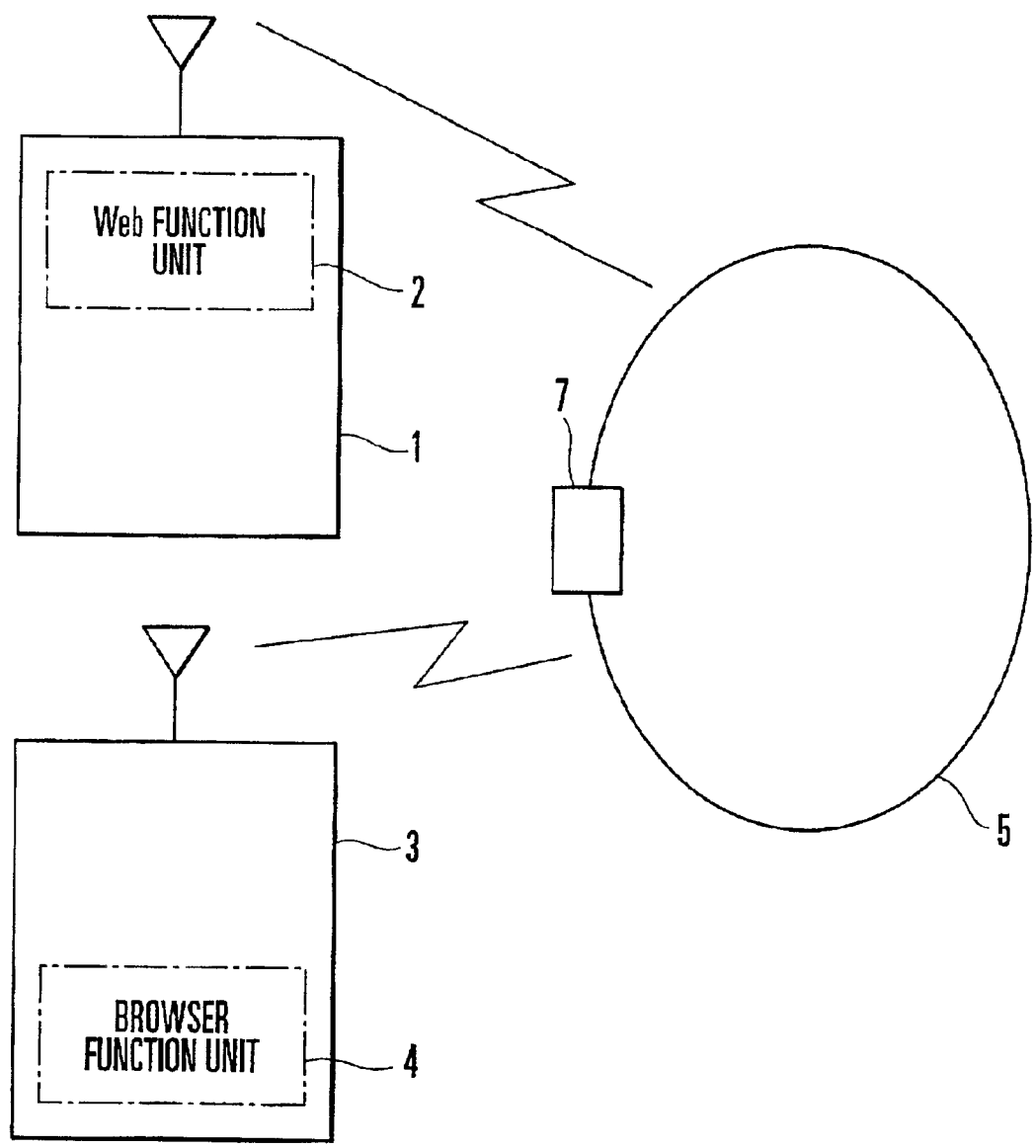
FIG. 4 is a block diagram schematically showing a communication system according to the third embodiment of the present invention.
Figure 5:
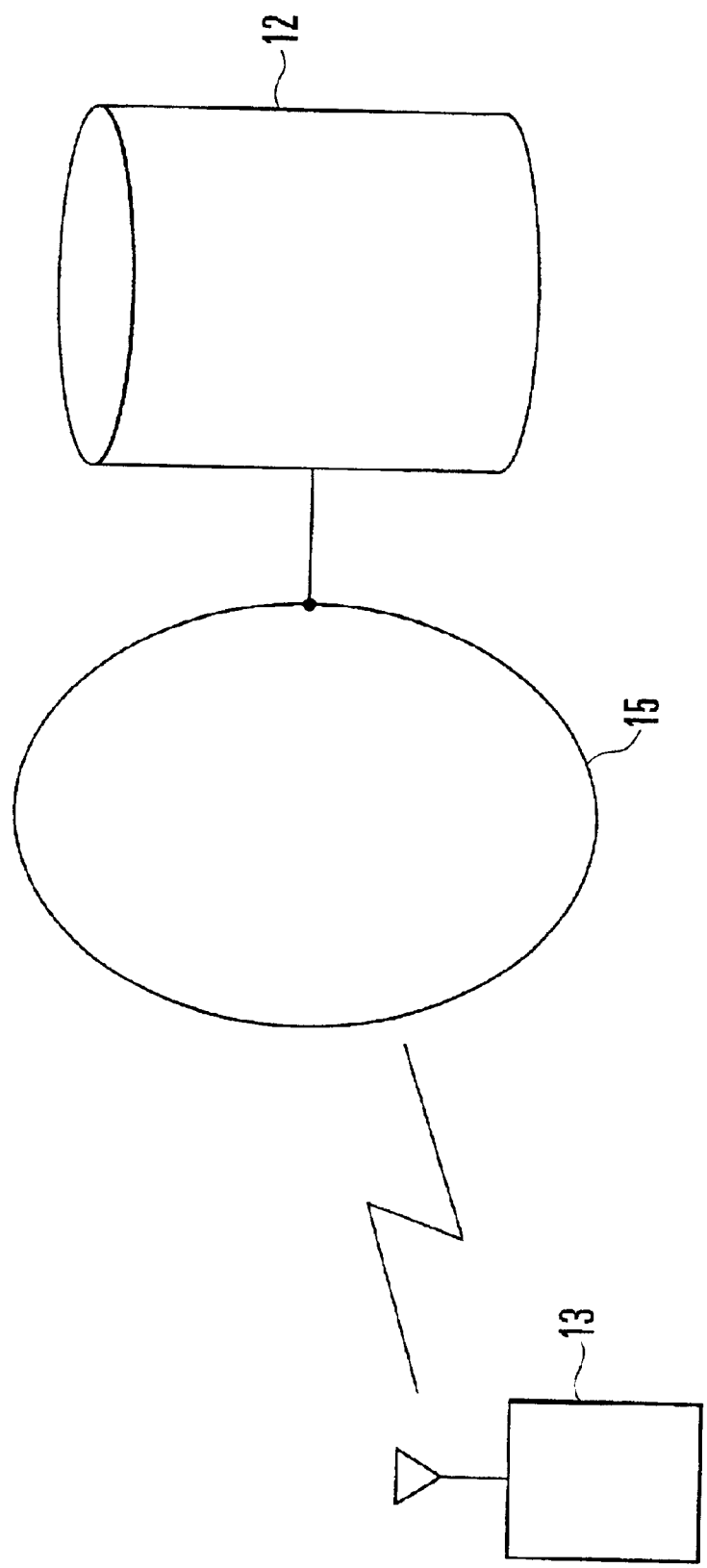
FIG. 5 is a block diagram schematically showing a conventional communication system.

A communication system according to the third embodiment of the present invention will be described with reference to FIG. 4. The basic configuration of the third embodiment is the same as that of the first embodiment, and a difference will be mainly explained.

A mobile station 1 is supposed to be frequently accessed by a mobile station 3 serving as its client. While content access communication is executed, for example, the speech communication function of the mobile station 1 may not be able to be used. Considering this, a mobile communication system network 5 incorporates a content cache memory as an equipment 7. The cache equipment 7 automatically caches the contents of the Web function-mounted mobile station 1 which is frequently accessed.

The cache equipment 7 responds to an access request from the mobile station 3 serving as a client, which can decrease the response load of the frequently accessed mobile station 1. This arrangement can improve the response speed and response status of the frequently accessed mobile station 1 to the mobile station 3 serving as a client, and can decrease the frequency at which the original function of the mobile station 1 is inhibited.

If the cache equipment 7 has a function of periodically confirming the content update state of the mobile station 1, it can properly cache new contents after update. If the mobile station 1 itself has a function of transmitting a cache content rewrite request to the cache equipment 7, it can update contents cached by the cache equipment 7.

If the mobile station 3 similarly comprises a cache and the mobile communication network 5 incorporates a cache, only changed contents after the above-mentioned content update can be transmitted from the mobile communication network 5 to the mobile station 3 having the browser function. The mobile station 3 having a cache can also transmit changed contents to another device (including the mobile station 1 or a general-purpose Web server).

As a detailed application service in this case, only changed position information of the mobile station 3 may be transmitted in executing a position information application.

The communication system of the present invention can execute content change operation from a mobile station in real time. The mobile station can confirm the display status of edited/changed contents before another user can browse the contents. The mobile station can receive a Web information transmission/reception service. Further, the response load of a mobile station having a Web function can be decreased.

What is claimed is:

1. A mobile communication system, comprising:

a mobile communication system network; and first and second mobile stations connected to said mobile communication system network, said first mobile station comprising a Web function unit with a content server function in a World Wide Web (WWW), and said second mobile station comprising a browser function unit for browsing a WWW content, wherein said mobile communication system network comprises a cache equipment, which caches said content having a high access frequency among a plurality of contents provided by said Web function unit, and when said second mobile station requests said content, provides said content, cached in said cache equipment, to said second mobile station.

2. The mobile communication system of claim 1, wherein said a first mobile station provides a content; and wherein said second mobile station communicates with said first mobile station, via said mobile communication system network, and wherein said browser function unit is for browsing said content of said first mobile station.

3. A system according to claim 2, wherein said mobile communication system network includes a mobile station authentication device, which permits said second mobile station to browse said content of said first mobile station.

4. A system according to claim 2, wherein said second mobile station comprises a cache unit, and said cache unit caches a changed content when said content is updated.

5. A system according to claim 2, wherein said content server function includes at least one of a WWW server function, a mail server function, and a news server function.

6. A system according to claim 1, wherein said cache equipment confirms an update state of said content provided by said Web function unit, and caches an updated content based on a confirmation result.

7. A system according to claim 1, wherein said first mobile station outputs a cached-content rewrite request to said cache equipment when said content provided by said Web function unit is updated, and said cache equipment rewrites said content, cached in said cache equipment, in response to cached-content rewrite request from said first mobile station.

8. A mobile communication system, comprising:

a mobile communication system network;

a first mobile station that includes a WWW (World Wide Web) content server which provides a content;

a second mobile station that includes a browser and communicates with said first mobile station via said mobile communication system network for browsing said content of said first mobile station; and a cache, which is located in said mobile communication system network, and caches said content having a high frequency of access.

9. A mobile communication system according to claim 8, further comprising a mobile station authentication device, which is located in said mobile communication system network.

10. A mobile communication system comprising:

a mobile communication system network;

a first mobile station that includes a WWW (World Wide Web) content server, which provides a content;

a second mobile station that includes a browser and communicates with said first mobile station via said mobile communication system network for browsing said content of said first mobile station, wherein when said second mobile station requests said content having said high frequency of access, said cache provides said content having said high frequency of access to said second mobile station.

11. A mobile communication system according to claim 10, further comprising a mobile station authentication device, which is located in said mobile communication system network.

* * * * *